US005389171A

United States Patent [19]

Bartholmei et al.

[11] Patent Number: 5,389,171

[45] Date of Patent: Feb. 14, 1995

[54] METHOD OF MAKING A PRINTING BLANKET

[75] Inventors: Peter Bartholmei, Göttingen; Jürgen Reissmann, Northeim, both of Germany

[73] Assignee: Continental Aktiengesellschaft, Hannover, Germany

[21] Appl. No.: 119,845

[22] Filed: Sep. 13, 1993

[30] Foreign Application Priority Data

Sep. 12, 1992 [DE] Germany ............................ 4230594

[51] Int. Cl.[6] ............................................ B32B 31/26

[52] U.S. Cl. .................................... 156/155; 156/60; 156/196; 156/307.7; 264/51

[58] Field of Search .............. 156/60, 155, 196, 307.7; 428/141, 909; 264/49, 51

[56] References Cited

U.S. PATENT DOCUMENTS 1,918,937 7/1933 Shelton .............................. 428/141
4,015,046 3/1977 Pinkston et al. .................... 428/909
4,303,721 12/1981 Rodriguez .......................... 428/909
4,751,127 6/1988 Pinkston et al. .................... 428/909

*Primary Examiner*—Michael W. Ball
*Assistant Examiner*—Richard Crispino
*Attorney, Agent, or Firm*—Walter Ottesen

[57] ABSTRACT

The invention is directed to a method for producing a multi-layered elastic printing blanket such as an offset printing blanket having a structured surface. The printing blanket includes reinforcement carrier layers, an elastic intermediate layer and a cover layer made of rubber or a rubber-like material. The cover layer has a structured surface which is formed by first applying particles, which volatilize under the application of heat, to the unvulcanized cover layer and thereafter applying heat under the application of force thereby causing the particles to assume a gaseous state while generating pressures which impart a roughness to the surface of the cover layer.

2 Claims, 2 Drawing Sheets

METHOD OF MAKING A PRINTING BLANKET

FIELD OF THE INVENTION

The invention relates to a method for producing a multi-layer elastic printing blanket such as an offset printing blanket having reinforcement carrier layers, an elastic intermediate layer and a cover layer having a structured surface with the layers being joined to each other by vulcanization. The cover layer is made of rubber or a rubber-like material.

BACKGROUND OF THE INVENTION

With vulcanized printing blankets having a smooth surface, it is known to roughen these printing blankets by an abrading process. A surface roughness of 3 to 5 micrometers is obtained by grinding.

The abraded cover layer has good adhesion performance for the paper to be printed because of its roughened surface. The paper comes into contact with the surface of the printing blanket during the printing operation. Paper having different qualities can be excellently processed during printing operations with this abraded printing blanket.

The abrading or grinding process is difficult to carry out since the disadvantage is present that a longitudinal structure is imparted to the cover layer. This longitudinal structure affects the printing quality. Furthermore, producing an abraded printing blanket surface is very time consuming and expensive since several abrading operations are necessary. In addition, the compressibility and softness of the rubber layers in the printing blanket make the method steps difficult to control because the compressibility causes deformation problems over the width. This leads to a thickening of the edges of the cover layer and therefore of the printing blanket.

SUMMARY OF THE INVENTION

It is an object of the invention to provide a multi-layer elastic printing blanket having a cover layer which has a structured surface which can be produced in a simple manner and generates a higher quality of print. It is another object of the invention to provide an offset printing blanket.

The method of the invention is for making a multi-layered elastic printing blanket having a reinforcement carrier layer, an unvulcanized cover layer and an elastic intermediate layer, the cover layer being made of rubber or an elastomeric material and having an exposed surface, the layers of the printing blanket defining a composite layer structure. The method includes the steps of: providing particles which volatilize to a gas upon the application of heat; distributing the particles onto said exposed surface of said cover layer of said printing blanket while said cover layer is unvulcanized; pressing said particles into said exposed surface; applying a barrier under pressure to said surface of said unvulcanized cover layer to define a gas tight confined region between said barrier and said surface; applying heat to said composite layer structure to vulcanize said layers together while at the same time causing said particles to volatilize to a gas under pressure between said barrier and said surface of said cover layer whereby said gas under pressure imparts a predetermined roughness to said exposed surface of said cover layer; and, removing said barrier from said surface thereby allowing the gas to escape.

Coarse or fine solid particles are applied to the yet unvulcanized cover layer in dependence upon the surface structure desired for this cover layer. These particles then become gaseous with the application of heat. It is possible to press these solid particles into the surface during a subsequent calendering operation. After these particles are applied, they are subsequently removed by the increase in temperature during the vulcanization of the printing blanket.

Chemical compounds which are suitable for the particles are those which volatilize to gases at higher temperatures. This is the case with commercially available blowing agents.

According to an advantageous embodiment of the method of the invention, ammonium hydrogen carbonate or ammonium carbonate is used for the decomposable particles. These particles decompose to carbon dioxide, ammonia, water and traces of carbon monoxide. These two blowing agents have been previously used in the area of food stuffs because they are harmless with respect to their decomposition products. Furthermore, these expanding agents are present as a salt which is economical and easily available.

With the invention, the surface of the printing blanket is provided with a most favorable microroughness. This structured printing blanket surface does not have longitudinal structures or transverse streaks. Printing results having a greater uniformity are obtained with this printing blanket surface produced in accordance with the method of the invention since fluctuations in thickness which are produced over the width during manufacture can no longer occur.

The removal of dust produced by grinding associated with the previously known method is no longer necessary. Furthermore, no additional rubbing thickness for the grinding step is needed with the method of the invention. In addition, a negative effect on thickness tolerances over the length and width of the printing blanket is not present since the method of the invention is performed without grinding.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
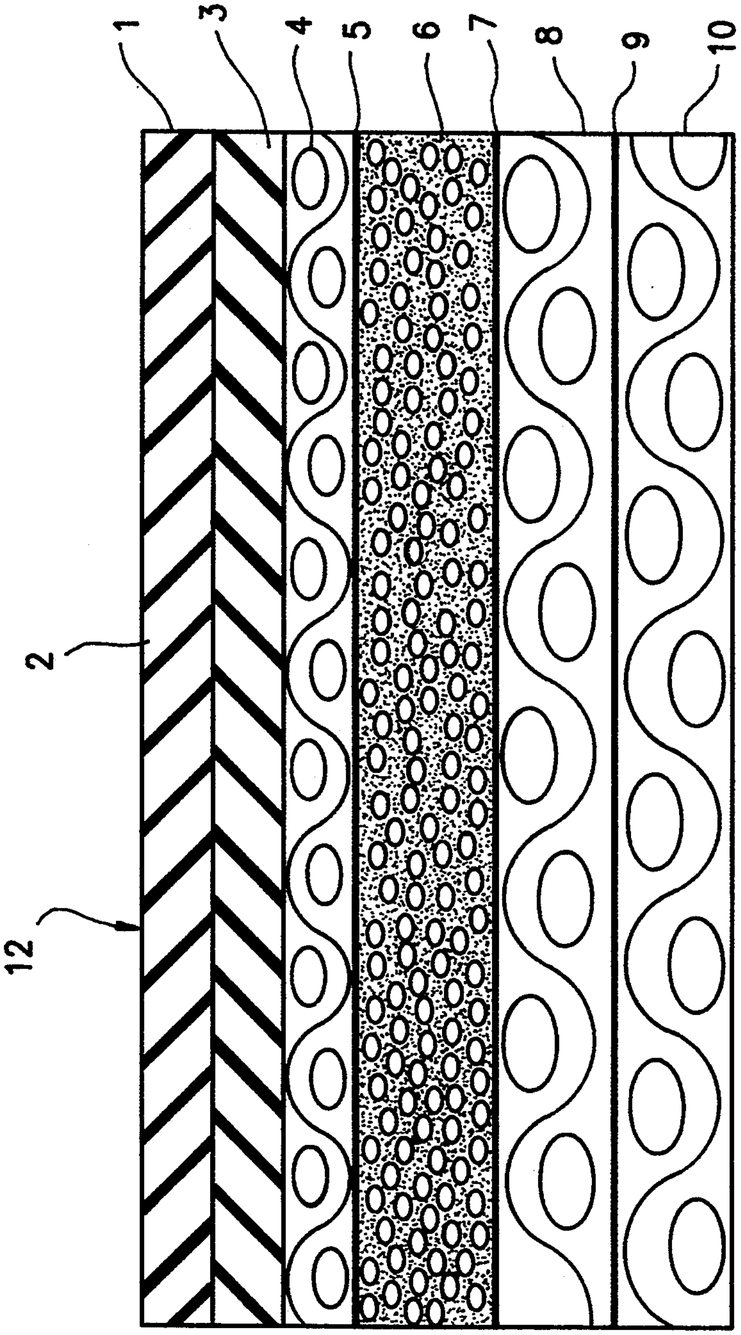
FIG. 1 is a section view taken through a printing blanket showing the layer configuration.

The printing blanket includes several layers which are caused to adhere tightly to each other by vulcanization. The outer cover layer 1 comprises two layers (2, 3) which are preferably made of elastic cured polymers such as nitrile rubber, butyl rubber, polysulfite rubber, EPDM, polyurethane, CSM or chloroprene or blends of these elastomers. A reinforcement carrier layer 4 made of a mixed fabric is disposed below the cover layer 1. This reinforcement carrier layer 4 is joined via a thin intermediate rubber layer 5 to a compressible elastic flexible microporous layer 6. The layer 6 is a microporous elastomer layer having a higher restoring force.

A reinforcement carrier layer 8 made of cotton fabric is arranged below the microporous layer 6 with a thin intermediate rubber layer 7 being interposed. The reinforcement carrier layer 8 is connected to a reinforcement carrier layer 10 with a further thin intermediate rubber layer 9 being interposed therebetween.

The surface 12 of the cover layer 1 is structured and has a roughness of 3 to 5 micrometers.

This structured surface 12 is generated pursuant to the method steps set forth below.

After spreading the cover layer onto the composite fabric, fine particles made of ammonium hydrogen carbonate or ammonium carbonate are uniformly distributed on the surface of the cover layer. Thereafter, the printing blanket surface is subjected to a calendering operation whereby the decomposable particles are pressed into the surface.

The particles of ammonia hydrogen carbonate or ammonium carbonate fully decompose with the application of heat. The particles are applied with a dusting machine or in that a slurry of the particles is applied in a coating or spreading process. The slurry of the particles includes a liquid such as toluene in which the particles are not soluble. If necessary, this method step can be carried out while adding a binding agent such as the binding agent used in the cover layer rubber mixture.

Thereafter, the entire blank is vulcanized under pressure and with the application of heat in a vulcanization oven or in a vulcanization vessel. The above-mentioned particles then decompose completely to form gases. The gases formed during decomposition of the particles generate pressures which deform the vulcanizing rubber to produce a structured surface 12 of the cover layer 1.

Figure 2:
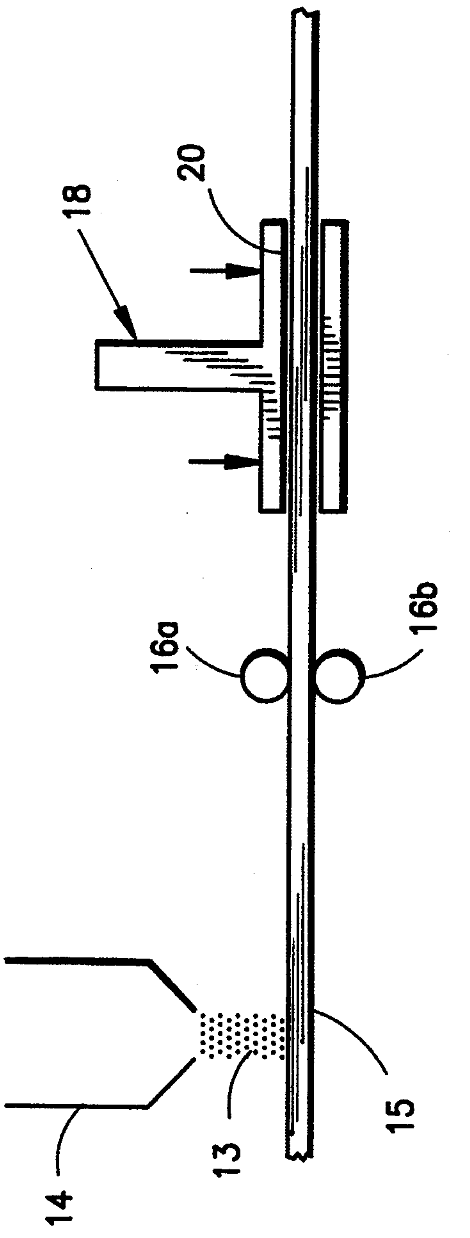
FIG. 2 is a schematic representation of the method of the invention.

The method of the invention is shown schematically in FIG. 2. Particles 13, which volatilize to a gas upon the application of heat, are provided in a holder 14 and distributed onto a moving band 15 of the composite layer structure shown in FIG. 1. The particles are then gently pressed into the unvulcanized (uncured) cover layer 1 in a calendering operation represented by rollers **16*a* and 16*b*. Thereafter, the band 15 is brought to a standstill and heat is applied to the composite layer structure with a press 18 causing the particles to volatilize to a gas under pressure between surface 20 of the press 18 and the surface of the cover layer 1. The gas under pressure forms tiny craters in the surface of the cover layer thereby imparting the required roughness thereto. The gas escapes when the press 18** is lifted.

Figure 3:
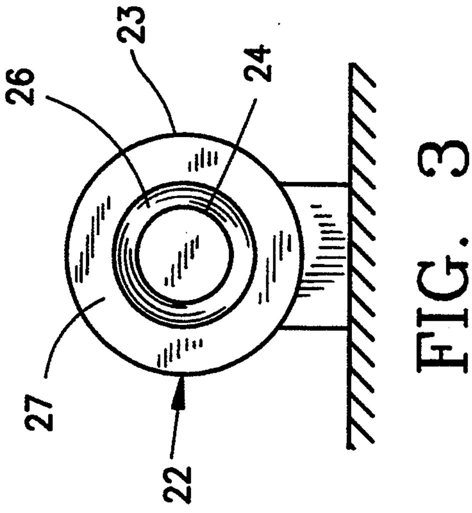
FIG. 3 is a schematic of an autoclave press which can be used in carrying out the method of the invention.

The press 18 represented schematically in FIG. 2 can be, for example, an autoclave press as shown in FIG. 3. The autoclave press 22 includes a housing 23 in which a heating drum 24 is mounted. A spiral coil 26 of the composite layer structure is placed on the heating drum 24 with the particles 12 already having been pressed into the surface of the unvulcanized cover layer 1. The housing is closed and steam under pressure in region 27 of the autoclave press 22 applies a uniform pressure to the entire spiral coil 26 while the drum 24 is heated. The gas developed by the volatilized particles escapes when the pressure of the steam is removed leaving the structural surface 12 formed in the cover layer 1.

In lieu of the autoclave press, equipment suitable for performing the rotocure process (continuous drum cure) can be used after the particles are pressed into the exposed surface of the cover layer 1 of the composite layer structure. The equipment for a rotocure process is noted, for example, in the text of Jochen Schnetger entitled "Lexikon der Kautschuk Technik", Hüthig Buch Verlag, Heidelberg, 1991, pages 545 and 546.

It is understood that the foregoing description is that of the preferred embodiments of the invention and that various changes and modifications may be made thereto without departing from the spirit and scope of the invention as defined in the appended claims.

What is claimed is:

1. A method of making a multi-layered elastic printing blanket having a reinforcement carrier layer, a cover layer and an elastic intermediate layer, the cover layer being made of rubber or an elastomeric material and having an exposed surface, the layers of the printing blanket defining a composite layer structure, the method comprising the steps of:

providing particles which volatilize to a gas upon the application of heat;

distributing said particles onto-said exposed surface of said cover layer of said printing blanket while said cover layer is unvulcanized;

pressing said particles into said exposed surface;

applying a barrier under pressure to said surface of said unvulcanized cover layer to define a gas tight confined region between said barrier and said surface;

applying heat to said composite layer structure to vulcanize said layers together while at the same time causing said particles to volatilize to a gas under pressure between said barrier and said surface of said cover layer whereby said gas under pressure imparts a predetermined roughness to said surface of said cover layer; and, removing said barrier from said surface thereby allowing the gas to escape.

2. The method of claim 1, said step of providing said particles including the step of providing particles of a compound selected from the group consisting of ammonium hydrogen carbonate and ammonium carbonate.

* * * * *